United States Patent Office

3,651,022
Patented Mar. 21, 1972

3,651,022
PROCESS FOR PREPARING A POLYAMIDE
Donald A. Holmer and Oscar A. Pickett, Jr., Pensacola,
Fla., assignors to Monsanto Company, St. Louis, Mo.
No Drawing. Filed Apr. 20, 1970, Ser. No. 30,247
Int. Cl. C08g 20/20
U.S. Cl. 260—78 R            8 Claims

ABSTRACT OF THE DISCLOSURE

Linear polyamides from which useful fibers may be conventionally melt-spun can be prepared in a relatively short time and with no substantial polymer gelation by heating a mixture of polyamide-forming reactants consisting essentially of 4,4'-methylene dianiline and from 1.01 to 1.09 moles of azelaic acid, sebacic acid, 1,11-undecanedioic acid, 1,12-dodecanedioic acid or a mixture of two or more of such acids per mole of the 4,4'-methylene dianiline in an inert atmosphere at a temperature between the melting point of the resulting polyamide and about 350° C. and in the absence of an extraneous polyamidation catalyst.

BACKGROUND OF THE INVENTION

It has long been known that when 4,4'-methylene dianiline (sometimes referred to hereinafter as MDA) and a $C_9$–$C_{12}$ straight-chain saturated aliphatic $\alpha,\omega$-dicarboxylic acid such as azelaic acid, sebacic acid or 1,12-dodecanedioic acid are polymerized in accordance with standard polyamidation procedures, i.e., by heating substantially equimolar proportions of the MDA and dicarboxylic acid at a temperature above the melting point of the resulting polyamide and in the absence of an extraneous polyamidation catalyst, the use of a reaction time long enough to provide a polymer having an inherent viscosity high enough for production of useful fibers normally results in a degree of polymer gelation that prohibits the production of such fibers. It has been found that the problem can be partially overcome by carrying out the reaction in the presence of an extraneous polyamidation catalyst such as litharge (as disclosed in U.S. 2,669,556; issued Feb. 16, 1954, to Carleton A. Sperati), certain organometallic tin compounds (as disclosed in U.S. 3,408,334; issued Oct. 29, 1968, to John R. Caldwell and Russell Gilkey) or strong acids such as phosphoric, sulfuric, hydrochloric and para-toluene sulfonic acids (as disclosed in U.S. 2,244,192; issued June 3, 1941, to Paul J. Flory). However, the use of such an extraneous polyamidation catalyst increases the cost of the polymerization process and results in some cases in undesirable side reactions that adversely affect the properties of the resulting polymeric product. A process with which linear fiber-forming polyamides of MDA and such dicarboxylic acids can be prepared without the use of such an extraneous catalyst is therefore highly desirable and it is an objective of this invention to provide such a process.

SUMMARY OF THE INVENTION

It has now been discovered that the aforementioned objective can be achieved by initiating the polymerization reaction in the presence of a slight molar excess of the $C_9$–$C_{12}$ dicarboxylic acid and, more specifically, that linear polyamides which are highly suitable for conventional melt-spining into useful fibers can be prepared in a relatively short time and with no substantial polymer gelation by heating a mixture of polyamide-forming reactants consisting essentially of 4,4'-methylene dianiline and from 1.01 to 1.09 moles of azelaic acid, sebacic acid, 1,11-undecanedioic acid, 1,12-dodecanedioic acid or a mixture of two or more of such acids per mole of the 4,4'-methylene dianiline in an inert atmosphere at a temperature between the melting point of the resulting polyamide and about 350° C. and in the absence of an extraneous polyamidation catalyst until the resulting polyamide has an inherent viscosity of at least about 0.4.

DETAILED DESCRIPTION OF THE INVENTION

As employed in this specification and the appended claims, the term "inherent viscosity" is a measure of the degree of polymerization of a polyamide and defined by the equation:

$$\text{Inherent viscosity} = \frac{\log_e \eta_r}{C}$$

wherein $\eta_r$ is the ratio of the absolute viscosity (in centipoises) at 25° C. of a solution of 0.5 gram of the polyamide in 100 milliliters of a solvent composed of 95 percent by weight of dimethylacetamide and 5 percent by weight of lithium chloride to the absolute viscosity (in centipoises) at 25° C. of the solvent alone and C is 0.5 (the concentration of the polyamide in grams per 100 milliliters of the solvent).

The term "extraneous polyamidation catalyst," as used in this specification and the appended claims, is intended to represent a substance which is not MDA, a $C_9$–$C_{12}$ straight-chain saturated aliphatic $\alpha,\omega$-dicarboxylic acid or a product obtained by heating a mixture of polyamide-forming reactants consisting essentially of MDA and such a $C_9$–$C_{12}$ dicarboxylic acid in an inert atmosphere at a temperature between the melting point of the resulting polyamide and about 350° C. (e.g. a product of the decomposition of MDA or the $C_9$–$C_{12}$ dicarboxylic acid) and which, if present during the polymerization of polyamide-forming reactants consisting essentially of MDA and such a $C_9$–$C_{12}$ dicarboxylic acid, substantially changes the rate of the polymerization process.

The term "consisting essentially of" as employed in this specification and the appended claims with respect to the mixtures of reactants polymerized is intended to leave the mixtures open to the substitution of minor equimolar amounts of other polyamide-forming reactants which do not change the basic nature of the polymerization process. Thus, for example, there may be substituted for up to about 20 mole percent of the MDA in the mixtures an equimolar amount of another diamine or other diamines such as, for instance, bis-(4-aminocyclohexyl) methane, meta-xylylene diamine, para-xylylene diamine, cyclohexanebis(methylamine) or a $C_6$–$C_{12}$ straight-chain saturated aliphatic diamine (e.g. hexamethyl diamine). The process of this invention may also be carried out in the presence or absence of a solvent (e.g. a phenolic compound such as meta-cresol) and/or one or more other non-polyamide-forming substances which may be inert (e.g. a pigment such as titanium dioxide) or which may combine chemically with the polyamide-forming reactants or the resulting polyamide (e.g. a dyeability modifier such as N-aminoethylpiperazine) but which substances, in either case, do not substantially change the rate of the polymerization reaction. Usually, such substances will not be present in amounts greater than about one percent by weight of the polyamide-forming reactants.

As aforesaid, the $C_9$–$C_{12}$ straight-chain saturated aliphatic $\alpha,\omega$-dicarboxylic acids with which MDA can be polymerized by the process of this invention are azelaic acid, sebacic acid, 1,11-undecanedioic acid, 1,12-dodecanedioic acid and mixtures of two or more of such acids. MDA has the structural formula

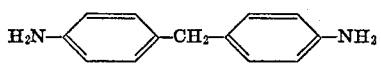

and, accordingly, the polyamides prepared by the process of this invention are those consisting essentially of recurring structural units having the formula

wherein $n$ is a positive integer of from 7 to 10.

In a preferred embodiment, the process of this invention is one of melt polymerization in which the mixture of polyamide-forming reactants consisting essentially of the MDA and $C_9$–$C_{12}$ $\alpha,\omega$-dicarboxylic acid is heated to a temperature above (preferably from about 5° to about 20° C. above) the melting point of the resulting polyamide and maintained at such a temperature until the resulting polyamide has an inherent viscosity high enough that the polyamide can be spun into useful fibers, i.e., an inherent viscosity (as defined hereinbefore) of at least about 0.4. The melting points of the resulting polyamides are generally higher than 250° C. and specifically, for example, about 268° C. when the dicarboxylic acid is azelaic acid, about 270° C. when the dicarboxylic acid is sebacic acid and about 256° C. when the dicarboxylic acid is 1,12-dodecanedioic acid. The process can be carried out at temperatures up to about 350° C., if desired. However, temperatures lower than about 320° C. are generally satisfactory and more convenient. It is also preferable to carry out the polymerization reaction in an inert atmosphere (e.g. nitrogen or carbon dioxide) and with agitation of the mixture to facilitate the removal of water.

The process can be conducted entirely at pressures of at least about one atmosphere with typical reaction times of about three hours or longer. However, the use of vacuum in the latter stages of the process normally shortens the time required to achieve the desired inherent viscosity. For example, it is usually preferable to heat the mixture of polyamide-forming reactants consisting essentially of MDA and dicarboxylic acid at the aforementioned temperature under a pressure of at least about one atmosphere for at least about 10 minutes (optionally up to about two hours or longer) and then under vacuum until the resulting polyamide has the desired inherent viscosity (generally for at least about 20 minutes and optionally up to about 2 hours or longer). Although high vacuum (such as a pressure as low as one millimeter of mercury or lower) generally provides best results, the use of a moderate vacuum (such as a pressure between about 50 and about 200 millimeters of mercury) normally gives good results including a satisfactory reaction rate.

When carried out in accordance with the aforedescribed procedure, the process of this invention takes place with no substantial product gelation (which results when an undesirably high degree of polymer cross-linking occurs) and provides polyamides that can be melt-spun by conventional nylon-66 melt-spinning techniques into fibers having various uses such as, for example, the reinforcement of pneumatic tires. The resulting fibers can be hot-drawn or cold-drawn by conventional techniques, in general at a draw ratio of at least about 1.5 and in most cases from about 2.5 to about 4 or higher. When fibers having relatively high tenacities after drawing are sought for uses in which high tenacity is important, e.g. in tire yarn, the polymerization process can be continued without substantial product gelation until the resulting polyamide has an inherent viscosity of at least about 0.7 or, if desired, up to about 0.9 or higher.

The following Examples (I–IV) are included to illustrate the use of specific embodiments of the process of this invention in the preparation of fiber-forming polyamides of MDA and $C_9$–$C_{12}$ straight-chain saturated aliphatic $\alpha,\omega$-dicarboxylic acids in the absence of an extraneous polyamidation catalyst.

Example I

In a stainless-steel autoclave that had been thoroughly purged with nitrogen, a reaction mixture consisting entirely of 79.31 grams of MDA and 84.94 grams of sebacic acid (1.05 moles of sebacic acid per mole of MDA) was heated to 285° C. at atmospheric pressure and then maintained at that temperature and pressure for 30 minutes in an inert (nitrogen) atmosphere, with slow stirring of the mixture and in the absence of an extraneous polyamidation catalyst. The pressure in the autoclave was then lowered to 85 millimeters of mercury and held there for 85 minutes while maintaining the reaction mixture at 285° C. The resulting polymer (which had an inherent viscosity of 0.76 and was substantially completely ungelled) was extruded from the autoclave under a pressure of 120 p.s.i.g. through a 12-mil single-orifice spinneret at the rate of 0.61 gram per minute. Drawing of the resulting monofilament at a draw ratio of 4.0 over a draw-pin heated to 105° C. provided a fiber having a tenacity of 5.43 grams per denier.

Example II

In a stainless-steel autoclave that had been thoroughly purged with nitrogen, a mixture of polyamide-forming reactants consisting entirely of 69.39 grams of MDA and 84.63 grams of 1,12-dodecanedioic acid (1.05 moles of 1,12-dodecanedioic acid per mole of MDA) was heated to 270° C. at atmospheric pressure and then maintained at that temperature and pressure for 30 minutes in an inert (nitrogen) atmosphere, with slow stirring of the mixture and in the absence of an extraneous polyamidation catalyst. The pressure in the autoclave was then lowered to 60 millimeters of mercury and held there for 110 minutes while maintaining the reaction mixture at 270° C. The resulting polymer (which had an inherent viscosity of 0.86 and was substantially completely ungelled) was extruded from the autoclave under a pressure of 170 p.s.i.g. through a 12-mil single-orifice spinneret at the rate of 0.39 gram per minute. Drawing of the resulting monofilament at a draw ratio of 3.1 over a draw-pin heated to 105° C. provided a fiber having a tenacity of 3.01 grams per denier.

Example III

When the procedure of Example II was repeated with the exception that the mixture of polyamide-forming reactants consisted entirely of 69.39 grams of MDA and 82.22 grams of 1,12-dodecanedioic acid (1.02 moles of 1,12-dodecanedioic acid per mole of MDA), the pressure in the autoclave was held at 60 millimeters of mercury for 90 minutes (rather than 110 minutes) and the resulting polymer was extruded from the autoclave at the rate of 0.53 gram per minute, the polymer (which had an inherent viscosity of 0.95) was substantially completely ungelled and the fiber could be readily cold-drawn or hot-drawn (e.g. over a draw-pin heated to 105° C.) at a draw ratio of 2.5.

Example IV

When the procedures of Examples I–III are repeated with the exception that the mixtures of polyamide-forming reactants consist essentially of MDA and from 1.01 to 1.09 moles of azelaic acid, sebacic acid, 1,11-undecanedioic acid, 1,12-dodecanedioic acid or a mixture of two or more of such acids and each mixture of polyamide-forming reactants is heated at a temperature between 5° and 20° C. above the melting point of the resulting polyamide, the results are similar. That is, the resulting polymers are substantially completely ungelled, have an inherent viscosity of at least 0.4 (in most cases at least 0.7) and, when melt-spun by conventional techniques, form fibers that can be readily cold-drawn or hot-drawn and which, after being drawn, have sufficient tenacity for various normal uses of polyamide fibers.

Comparative Example A

When the procedure of Example I was substantially duplicated with the exception that the reaction mixture consisted initially of 79.31 grams of MDA and 80.9 grams of sebacic acid (1.00 mole of sebacic acid per mole of MDA), the resulting fiber was brittle and could not be drawn.

Comparative Example B

When the procedure of Example I was substantially duplicated with the exception that the reaction mixture consisted initially of 80.9 grams of sebacic acid and 83.27 grams of MDA (1.05 moles of MDA per mole of sebacic acid), the resulting fiber was brittle and could not be drawn.

Comparative Example C

When the procedure of Comparative Example A was substantially duplicated with the exception that the reaction mixture consisted initially of 79.31 grams of MDA, 80.9 grams of sebacic acid (1.00 mole of sebacic acid per mole of MDA) and 3.16 grams of nonanoic acid (0.05 mole of nonanoic acid per mole of MDA), the resulting fibers was brittle and could not be drawn.

The results of the process of this invention are surprising in view of the prior art disclosure (in U.S. 2,244,192) that when an acid is employed to catalyze the polymerization of the aromatic diamine and a straight-chain saturated aliphatic dicarboxylic acid such as azelaic acid or sebacic acid, it must be a strong acid (such as phosphoric or sulfuric) having a dissociation constant greater than $2 \times 10^{-3}$ whereas the $C_9$–$C_{12}$ straight-chain saturated aliphatic $\alpha,\omega$-dicarboxylic acids employed in molar excess in the process of this invention are weak acids having dissociation constants (in water at 25° C.) lower than $10^{-5}$. The unexpectedness of the effect of the slight molar excess of $C_9$–$C_{12}$ dicarboxylic acid employed in the present process can be appreciated even more fully when it is considered that, as shown in the foregoing Comparative Examples B and C, similar results are not obtained by using in place of the excess $C_9$–$C_{12}$ dicarboxylic acid an equivalent molar excess of MDA or a molar equivalent of a straight-chain saturated aliphatic monocarboxylic acid having a similar molecular weight and similarly low dissociation constant (i.e., nonanoic acid).

We claim:

1. A process which comprises heating a mixture consisting essentially of 4,4'-methylene dianiline and from 1.01 to 1.09 moles of azelaic acid, sebacic acid, 1,11-undecanediolic acid, 1,12-dodecanediolic acid or a mixture of two or more of such acids per mole of the 4,4'-methylene dianiline in an inert atmosphere at a temperature between the melting point of the resulting polyamide and about 350° C. until the resulting polyamide has an inherent viscosity of at least about 0.4 as defined by the equation $$\text{Inherent viscosity} = \frac{\log_e \eta_r}{0.5}$$

wherein $\eta_r$ is the ratio of the absolute viscosity at 25° C. of a solution of 0.5 gram of the polyamide in 100 milliliters of a solvent composed of 95 percent by weight of dimethylacetamide and 5 percent by weight of lithium chloride to the absolute viscosity at 25° C. of the solvent alone.

2. The process of claim 1 wherein the temperature is lower than about 320° C.

3. The process of claim 1 wherein the temperature is from about 5° to about 20° C. above the melting point of the resulting polyamide.

4. The process of claim 1 wherein the heating is carried out under a pressure of at least about one atmosphere for at least about 10 minutes and then under a pressure lower than about 200 millimeters of mercury for at least about 20 minutes.

5. The process of claim 1 wherein the heating is continued until the resulting polyamide has an inherent viscosity of at least about 0.7.

6. A process which comprises heating a mixture consisting essentially of 4,4'-methylene dianiline and from 1.01 to 1.09 moles of azelaic acid, sebacic acid or 1,12-dodecanedioic acid per mole of the 4,4'-methylene dianiline at a temperature between the melting point of the resulting polyamide and about 320° C. in an inert atmosphere under a pressure of at least about one atmosphere for at least about 10 minutes and then under a pressure lower than about 200 millimeters of mercury until the resulting polyamide has an inherent viscosity of at least about 0.4 as defined by the equation $$\text{Inherent viscosity} = \frac{\log_e \eta_r}{0.5}$$

wherein $\eta_r$ is the ratio of the absolute viscosity at 25° C., of a solution of 0.5 gram of the polyamide in 100 milliliters of a solvent composed of 95 percent by weight of dimethylacetamide and 5 percent by weight of lithium chloride to the absolute viscosity at 25° C. of the solvent alone.

7. The process of claim 6 wherein the temperature is from about 5° to about 20° C. above the melting point of the resulting polyamide.

8. The process of claim 6 wherein the heating is continued until the resulting polyamide has an inherent viscosity of at least about 0.7.

References Cited

UNITED STATES PATENTS

| | | | |
|---|---|---|---|
| 2,669,556 | 2/1954 | Sperati | 260—78 R |
| 3,408,334 | 10/1968 | Caldwell et al. | 260—78 R |

HAROLD D. ANDERSON, Primary Examiner

U.S. Cl. X.R.

260—32.6 N